March 17, 1936.  E. W. HALL  2,034,576
BUFFING WHEEL
Filed July 11, 1935  2 Sheets-Sheet 1
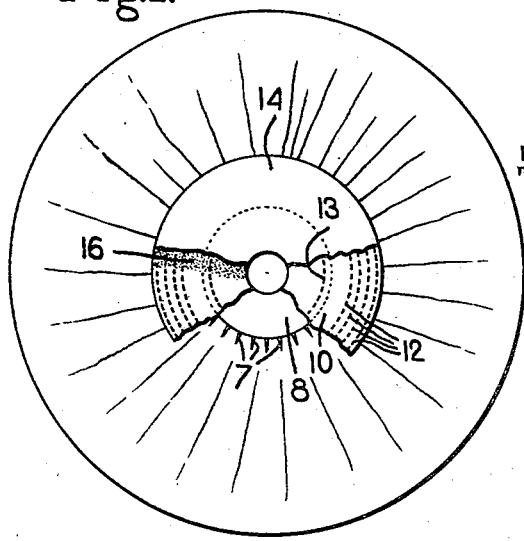
Fig.1.
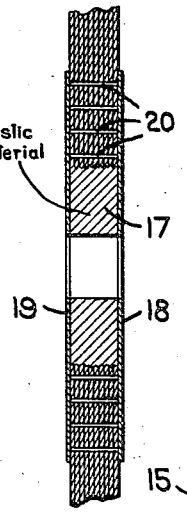
Fig.7.
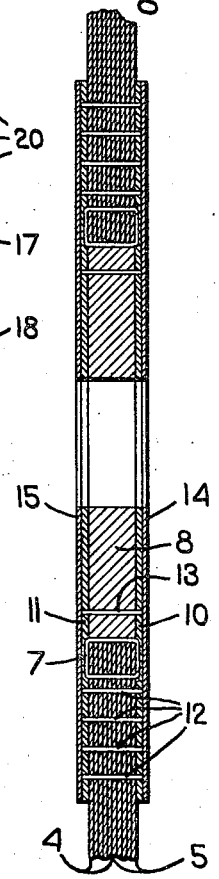
Fig.2.
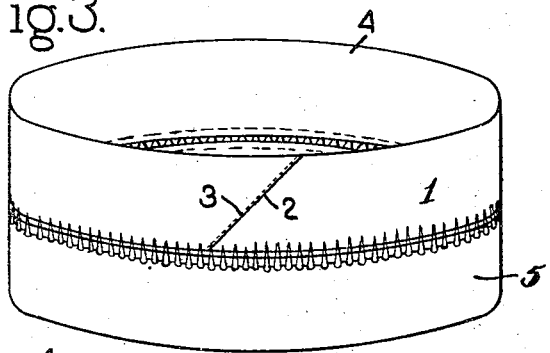
Fig.3.
Fig.4.
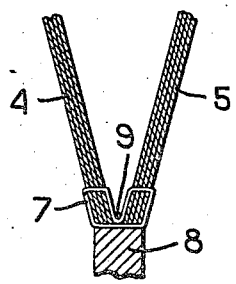
Fig.6.
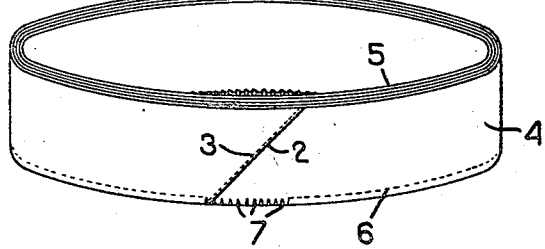
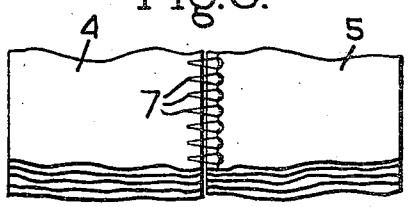
Fig.5.
Inventor.
Elisha W. Hall
by Heard Smith & Tennant.
Attys.

March 17, 1936.                E. W. HALL                 2,034,576
                              BUFFING WHEEL
                           Filed July 11, 1935          2 Sheets-Sheet 2
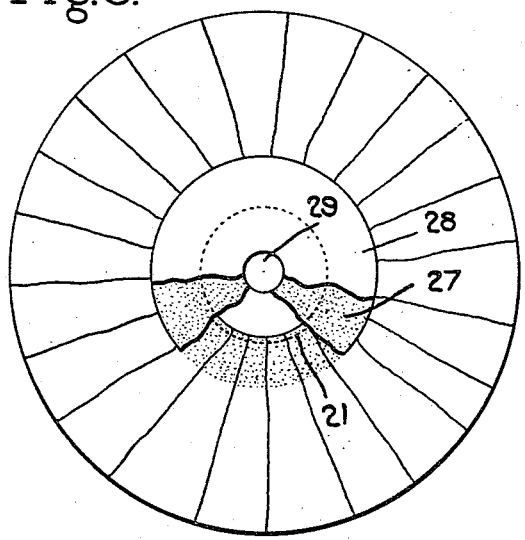
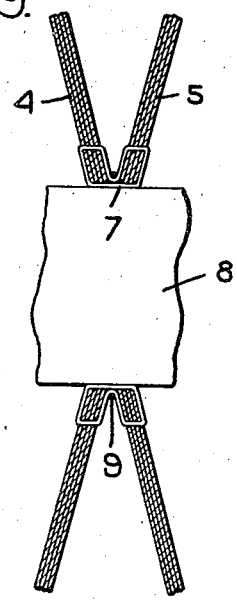
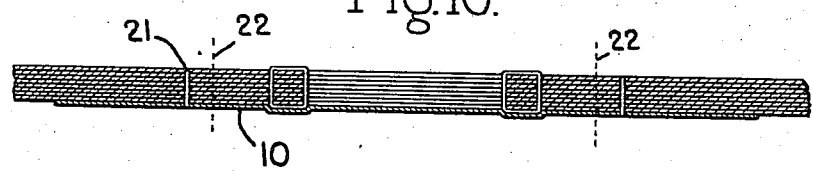
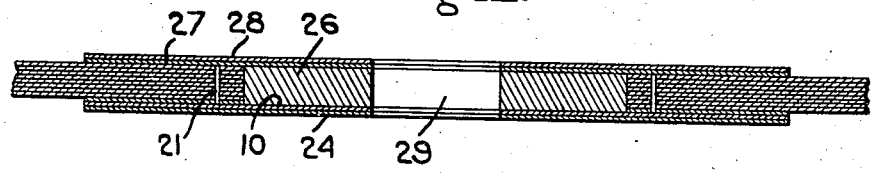
Inventor.
Elisha W. Hall
by Heard Smith & Tennant.
Attys.

Patented Mar. 17, 1936

2,034,576

UNITED STATES PATENT OFFICE 2,034,576

BUFFING WHEEL

Elisha Winthrop Hall, Scituate, Mass.

Application July 11, 1935, Serial No. 30,885

15 Claims. (Cl. 51—193)

This invention relates to improvements in buffing wheels or buffing disks and the method of manufacturing the same, and the principal object of the invention is to provide a buffing disk or wheel of novel construction which can be readily and economically manufactured, which will be of greater rigidity in respect to lateral flexion than buffing disks of usual constructions, and which will be free of all metal parts likely to be projected from a highly rotating buffing wheel and therefore dangerous to the operator.

More specifically the invention relates to improvements in buffing wheels and the method of making buffing wheels comprising two juxtaposed sets of radial annular layers of buffing material of equal width, a line of stitching having widely spaced stitches uniting the inner circular edges of the layers of each set and also joining together the inner edges of both sets and gathering the same about a circle of predetermined relatively smaller circumference than the length of said stitched edges, with anchoring disks of fibrous material of relatively smaller diameter than the diameter of the periphery of said sets and concentric therewith engaging the outer faces of the assembled sets, with means for permanently securing the anchoring disks to the outer faces of the assembled sets of buffing material and preferably also to the hub.

It will be understood that the term "buffing wheel" is used herein as descriptive of a buffing wheel made of two juxtaposed sets of radial annular layers of buffing material and that any desirable number of such buffing wheels may be assembled upon a shaft or arbor to produce a buffer or buffing wheel of any desired width.

The preferred method of producing a buffing wheel embodying the present invention comprises, first, producing two like bands each having a periphery equal to that of the desired buffing wheel and formed of a series of superimposed layers of equal width, then assembling the two bands by lines of overedge or jump stitching having widely spaced stitches, passing through the superimposed edges of both layers, and uniting them in edge to edge relation, then drawing in the stitches intermediate of the adjacent edges of the superimposed layers to gather the inner edges about a circle of such predetermined smaller circumference than the length of the stitched edges as to cause the sets of layers to lie side by side in radial relation to the axis of the circle about which they are gathered. This desirably is accomplished by placing the bands in edge to edge relation upon cylindrical forms which are separated apart a distance slightly greater than the combined thickness of the two sets of layers, with the line of stitching intermediate of the edges of the layers over the spaces between the two cylindrical forms, passing a flexible gathering member, such as a piano wire, around the line of stitching, and drawing it in sufficiently to bring the stitched edges to a circle of predetermined diameter, which will cause the layers of buffing material to extend substantially radially with respect to the axis of said circle, then suitably securing the assembled layers together, as by a line or lines of stitching preferably concentric with the line of overedge stitching and suitably spaced therefrom, thereafter withdrawing the gathering member and removing the assembled disks from the forms.

The assembled superimposed layers may then be mounted upon a hub of suitable material in any desired manner, for example, a hub of fibrous, preferably laminated material, of suitable thickness, may be placed within the circle defined by the overedge stitching, and anchoring disks of relatively smaller diameter than the diameter of the buffing wheel secured both to the hub and to the superimposed layers by rows of stitching, or a hub comprising a suitable plastic material containing an adhesive may be moulded within the hub in such manner that some of the adhesive composition will be forced into the interstices between the fibres forming the inner edge of the buffing material and into the spaces between the plaits of the material, thereby rigidly securing the buffing material to the hub and superimposed layers by adhesive or by stitching.

In order to make a thinner buffing wheel and to avoid the additional thickness of the material which is produced by the gathering in of the layers, as described, the central portion of the disks may be cut or died out between the line of overedge stitching and the anchoring stitching which passes through the superimposed layers, the anchoring disk applied to one side of the superimposed layers and secured thereto by a suitable adhesive, and the hub placed within the circular opening and secured to the anchoring disk and to the inner periphery of the buffing material and to a complementary anchoring disk by a strong adhesive, such as glue.

Desirably protective disks of fibrous material, preferably heavy duck, of the same diameter as the anchoring disks, are then secured to the outer faces of the anchoring disks by a strong adhesive, such as a strong glue of such consistency that it will impregnate the anchoring disks and also the exposed portions of the lines of stitching, and which will also partially impregnate the adjacent faces of the protective disks, thereby securing the protective and anchoring disks together and also securing the hub to the fabric layers.

Preferred embodiments of the invention are illustrated in the accompanying drawings, which also illustrate the manner in which the buffing wheel is constructed and assembled.

In the drawings:

Fig. 1 is a view illustrating a buffing wheel embodying the invention, portions of the protective and anchoring disks being broken away to show the various lines of stitching;

Fig. 2 is an enlarged diametrical vertical sectional view of the buffing wheel illustrated in Fig. 1;

Fig. 3 is a perspective view of a single endless band of buffing cloth which preferably is cut on the bias;

Fig. 4 illustrates two sets of bands each made of a plurality of concentric layers concentrically superimposed and secured together by overedge stitching;

Fig. 5 is a detail plan view of a short section of the two sets of superimposed layers in flat position, with the adjacent edges of the layers in juxtaposed relation, and showing the stitching uniting the sets of superimposed layers;

Fig. 6 illustrates the manner in which the respective sets of layers of equal width are gathered up by a gathering member, such as a piano wire, engaging the line of stitching intermediate of the sets of layers and drawing the same upon a suitable hub and showing the layers approaching a position in radial relation to the center of the hub or a circle of predetermined diameter which defines the inner edges of the layers of buffing material;

Fig. 7 is a vertical sectional view, partially broken away, of a buffing wheel having a hub formed of plastic material which when set provides a rigid construction;

Fig. 8 illustrates a buffing wheel construction in which the inner edge portion of the gathered layers of material are cut away concentrically with the line of overedge stitching and suitably secured together and to the hub;

Fig. 9 is a view similar to Fig. 6 illustrating more completely the manner in which the bands are gathered together upon a suitable mandrel;

Fig. 10 is a diametrical sectional view of the annular disks of buffing material united at the inner edge by overedge stitching and also united by a line of stitching remote therefrom extending through an anchoring disk, and showing in dotted lines the position of a circular line through which the superimposed layers are cut for the purpose of removing the inner overedge stitched material;

Fig. 11 is a similar view illustrating the application of an adhesive to the inner edges of the superimposed layer and to an overlying protecting sheet; and, Fig. 12 is a similar view showing a completed thin buffing wheel.

I am aware that buffing wheels have heretofore been produced by gathering in centrally of their width cylindrical or endless bands of buffing material, as is illustrated in the patent to Eno, No. 249,914, granted November 22, 1881, which comprises a buffing wheel having a filling of warp, wick, or other filamentous material, enclosed in a cylindrical band of textile material having a shirring string gathering the band centrally of its width to produce a buffing wheel in which the layers of buffing material extend substantially radially with respect to the axis of the wheel.

I am also aware that buffing wheels having a rigid hub with a series of strips of textile fabric bent centrally around a ligature spirally wound upon the hub so that the strips extend radially therefrom are disclosed in the patent to Webster, No. 533,833, granted February 5, 1895.

I am also aware of Patent 1,404,620 Levett granted January 24, 1922, which comprises a buffing or polishing wheel having a body made of a spirally wound strip of material with a series of central diamond-shaped notches cut therefrom and with the material gathered centrally about the hub by a ligature to cause the layers of buffing material to extend radially from the hub, the notches being for the purpose of preventing undue increase in thickness of the body or to cause a puckering at the hub when the ligature is drawn taut.

I am also aware of the construction of the buffing wheel in patent to Levett No. 1,298,522 granted March 25, 1919, and the reissue thereof No. 15,226 November 15, 1921, in which a spirally wound body of material is gathered centrally by a ligature about a central hub, with the layers doubled widthwise of the strip and gathered around the hub in such manner as to extend outwardly from the hub, with certain or all of the layers provided with intermediate strips each doubled widthwise and extending along its median line.

In all of these constructions the folding of the series of spirally wound layers about the ligature causes, first, a considerable thickening of the layers at the hub of the wheel, and, second, produces a convex edge for each series of layers thus wound upon the hub, for the reason that the layers which wrap around the ligatures are progressively shortened an amount corresponding to the thickness of the progressively enclosed layers.

It is understood that in commercial constructions of this character ligatures or members for drawing in the central portion of the superimposed webs are of wire which are permitted to remain in the finished buffing wheel and not infrequently such wires break and are projected outwardly from the buffing wheel with great force, thereby endangering the operator. In other types of buffing wheels the inner circular edges of radially disposed disks of equal width are secured together by circular metal binding rings passing around the inner edges of the cloth and having laterally extending teeth embedded in the disks, the edges of which they enclose, as shown in the patent to Meyers et al. No. 1,922,108 granted August 15, 1933. The teeth and even the metal binding rings themselves in such constructions are likely to break and fly out by reason of centrifugal force.

The present invention is designed to avoid all the imperfections of buffing wheels of the character above referred to and to provide a buffing disk having no metal parts and one which comprises a central portion of greater rigidity and in which the several layers of buffing material are more firmly anchored than in disks which have heretofore been produced.

In the production of the present invention a strip 1 of buffing material, preferably cut on the bias, is formed into an annular band with the edges 2 and 3 thereof overlapped, and preferably stitched together at an angle to the axis of the strip. Any desired number of such endless strips are then concentrically superimposed to produce a set or band 4. A second band or set 5 of concentric endless strips is similarly produced. The bands are then secured together by a line of overedge or jump stitching.

As illustrated in Fig. 4, the outer band 4 and the inner band 5, each comprising a multiplicity of strips, are secured together by a line of overedge stitching 6 in which the stitches 7 are widely spaced apart. This line of stitching may be made upon an overedge sewing machine or by a jump-stitch sewing machine, so that when the sets 4 and 5 are arranged flat-wise, as illustrated in Fig. 5, the stitches cross the adjacent edges of the respective sets of layers. The layers 4 and 5 in extended form are then drawn down upon a hub 8, preferably by means of a drawing member such as a long strip of piano wire 9 encircling the hub and engaging the line of stitches intermediate of the edges of the respective sets of layers. When the gathering member 9 is drawn down as tightly upon the periphery of the hub 8 as possible, the sets 4 and 5 of buffing material will assume a substantially radial position with relation to the axis of the hub.

Anchoring disks of fibrous material 10 and 11 of larger diameter than that of the hub and of considerably smaller diameter than the periphery of the buffing wheel are then placed upon opposite sides of the hub and the assembled layers of buffing material and all are secured together by lines of through and through stitching 12 which desirably are concentrically or spirally arranged with respect to the axis of the hub. Another line or lines of stitching 13 desirably pass through the anchoring disks and the central hub, thus firmly securing the anchoring disks to the hub.

In order further to secure the hub and the assembled layers of buffing material permanently in position and also to protect the threads and to lock them in place, protective disks 14 and 15, preferably corresponding in diameter to the anchoring disks, are adhesively secured to the anchoring disks by a strong glue 16 made of such consistency that it will impregnate the portion of the adjacent surfaces of the anchoring disks and the protective disks and will also impregnate the exposed portions of the stitches therebetween. The adhesive is particularly effective in preventing displacement or breakage of the through and through stitching, and also of the stitching which connects the inner edges of the radially disposed layers of buffing material.

The hub of the buffing disk may be of any suitable material, such as fibre board, or may be formed of plastic material. As illustrated in Fig. 7 a hub 17 of suitable plastic material containing an adhesive is moulded under pressure within the central circle which defines the inner edges of the layers of buffing material while the hub is in a plastic state, so that some of the plastic material is forced into the interstices of the inner edge portion of the fabric and into the spaces between adjacent layers, particularly into the spaces between the plaits of such layers, thereby firmly securing the inner edges of the disks of buffing material to the hub. Protective layers 18 and 19 of heavy canvas of suitable diameter are then secured to the outer faces of the disks by an adhesive which serves not only to anchor the protective disks to the outer layers of the buffing wheel, but also to impregnate the stitching 20 which secures the layers of buffing material together. While it is preferable to form large buffing wheels from two bands of superimposed layers united together and to each other by lines of overedge stitching, it is practical in some instances to plait the inner edges of the layers of buffing material in such manner as to produce a circle for a hub of the desired diameter, then to secure a number of such layers together by concentric lines or a spiral line of through and through stitching, and thereafter to cast a hub from plastic adhesive material within said circle.

In the construction of buffing disks or wheels in the manner above described, the thickness of the gathered material is necessarily increased as the center is approached. In Figs. 8 to 12 a modification of the invention is illustrated which permits the production of buffing disks having a thinner central portion so that a greater number can be assembled upon an arbor. In the production of this thinner buffing disk or wheel strips of buffing material are formed in annular bands in the manner above described and the bands secured together by overedge or jump stitching. The outer band 4 and inner band 5 are secured together by widely spaced overedge stitches 7, then placed upon a suitable hub or mandrel 8 and drawn down upon the hub by a drawing member such as a strip of piano wire 9. An anchoring disk 10 is then placed adjacent the outer layer of one of the bands 4 or 5 and the assembled disks removed from the mandrel. The superimposed sets of layers 4 and 5 and the anchoring member 10 are then firmly secured together by a preferably circular line of stitching 21. After the layers are thus secured together the central portion is cut out by a circular die along the line 22 shown in dotted lines in Fig. 10, thereby providing a large hub opening 23 as shown in Fig. 11. A protective disk 24 is then secured by a suitable adhesive, preferably a strong glue, to the anchoring disk 10 and the inner edges of the superimposed layers impregnated with glue which may be applied in any manner as by a suitable spraying device 25, the glue being also spread over the inner face of the protective disk 24. The hub 26 of suitable material, of a thickness equal to the thickness of the superimposed layers, is then fitted within the hub opening 23 and an anchoring disk 27 glued to the hub and to the face of the uppermost superimposed layer. A protective disk 28 is similarly glued to the anchoring disk and finally a central cylindrical opening 29, adapted to fit the arbor of the machine, is cut through the hub and the anchoring and protective disks, as illustrated in Fig. 12. By reason of this construction the thicker portion of the gathered layers is removed and a thinner buffing disk or wheel is produced.

By reason of the constructions above described each of the radially arranged layers is of the same width when thus assembled, presenting a cylindrical periphery which needs little or no trim, thereby saving considerable expense in the production of the buffing wheel. The buffing wheel thus produced is of uniform quality and the folds produced by the gathering are substantially uniform. The adhesive connection between the anchoring disks and the protective disks and the hub produces a very rigid central portion which will remain true irrespective of the handling of the buffing wheel or the strains exerted upon it by centrifugal force when in use, which in many instances is sufficient to break or distort the metal bands of buffing wheels of the character heretofore described. The buffing wheel contains no metal parts, the breakage of which is likely to produce injury to the operator. The periphery of the buffing wheel is of substantial uniformity throughout its life and it can be worn down safely to the periphery of the anchoring and protective disks without danger of breakage of the anchoring stitches or the displacement of any of the layers, such as frequently occur in buffing disks in which the layers are wound in flat spirals and in which the end of the outermost spiral frequently becomes detached and by reason of centrifugal force of the rapid rotation progressively unwinds the spiral, thus endangering the operator.

It will be understood that in the present invention bands of buffing material may be flat wound from a long strip of material of suitable width as the anchorages above described will so firmly unite the layers that danger of unwinding is entirely avoided. The bands preferably, however, are constructed of strips of uniform width, the ends of which are secured together before assembling in the concentric relation above described.

It will be understood that the particular embodiments of the invention and the method of producing the same herein described are of an illustrative character and not restrictive, and that various changes in form, construction and arrangement of parts may be made within the spirit and scope of the claims. It will also be understood that the sets of layers of buffing material may be gathered in the manner above described between temporary removable forms and the permanent hub thereafter inserted instead of gathering the sets directly upon the permanent hub. In each case, however, the gathering member, if metallic, is removed before the wheel is completed.

Having thus described the invention, what is claimed as new, and desired to be secured by Letters Patent, is:

1. A buffing wheel comprising two juxtaposed sets of radial annular layers of buffing material of equal width, a line of stitching having widely spaced stitches uniting the inner circular edges of the layers of each set and also joining together the inner edges of both sets said stitches and inner edges of said layers being gathered about a circle of predetermined relatively smaller circumference than the length of said stitched edges, anchoring disks of fibrous material of relatively smaller diameter than the diameter of the periphery of said annual layers of buffing material and concentric therewith engaging the outer faces of the assembled sets and a plurality of rows of stitching extending through and through said disks and the layers of buffing material therebetween.

2. A buffing wheel comprising two juxtaposed sets of radial annular layers of buffing material of equal width, a line of stitching having widely spaced stitches uniting the inner circular edges of the layers of each set and also joining together the inner edges of both sets said stitches and inner edges of said layers being gathered about a circle of predetermined relatively smaller circumference than the length of said stitched edges, a hub of rigid material having a thickness corresponding to the thickness of the assembled layers fitting within the gathered inner edges of said layers of buffing material, anchoring disks of fibrous material of greater diameter than said hub engaging the outer faces of the assembled annular layers of buffing material, rows of stitching extending respectively through and through said anchoring disks and the layers of buffing material therebetween and through said disks and said hub, and protective disks of fibrous material secured to said hub and anchoring disks and the portions of the stitching therebetween by a strong impregnating adhesive.

3. A buffing wheel comprising two juxtaposed sets of radial annular layers of buffing material of equal width, a line of stitching having widely spaced stitches uniting the inner circular edges of the layers of each set and also joining together the inner edges of both sets said stitches and inner edges of said layers being gathered about a circle of predetermined relatively smaller circumference than the length of said stitched edges, a hub of rigid material having a thickness corresponding to the thickness of the assembled layers fitting within the gathered inner edges of said layers of buffing material, anchoring disks of fibrous material of greater diameter than said hub engaging the outer faces of the assembled annular layers of buffing material, a plurality of rows of stitching extending through and through said disks and the layers of buffing material therebetween, and protective disks of heavy duck cloth secured to said hub and anchoring disks and the portions of the stitching therebetween by a strong impregnating adhesive.

4. A buffing wheel comprising two juxtaposed sets of radial flat wound spirals of buffing material of equal width, a line of stitching having widely spaced stitches uniting the inner circular edges of the layers of each set and also joining together the inner edges of both sets said stitches and inner edges of said layers being gathered about a circle of predetermined relatively smaller circumference than the length of said stitched edges, a hub of fibrous material having a thickness corresponding to the thickness of the assembled layers fitting within the gathered inner edges of said layers of buffing material, anchoring disks of fibrous material of greater diameter than said hub engaging the outer faces of the assembled annular layers of buffing material, and a plurality of rows of stitching extending through and through said disks and the layers of buffing material therebetween and through said disks and said hub, and protective disks of fibrous material secured to said hub and anchoring disks and the portion of stitching therebetween by a strong impregnating adhesive.

5. A buffing wheel comprising two juxtaposed sets of radial annular layers of buffing material of equal width, a line of stitching having widely spaced stitches uniting the inner circular edges of the layers of each set and also joining together the inner edges of both sets said stitches and inner edges of said layers being gathered about a circle of predetermined relatively smaller circumference than the length of said stitched edges, a hub of plastic material containing an adhesive moulded into said circle and adhesively engaging at its periphery the fibres of the inner edges of said layers of buffing material, stitching extending through and through the layers of buffing material securing them together, and protective disks of heavy cloth secured to said hub and to the outer layers of said buffing material and the portions of the stitching therebetween by a strong impregnating adhesive.

6. A buffing wheel comprising a plurality of annular layers of buffing material gathered to form an inner circle of predetermined diameter and secured together by through and through stitching, a hub of plastic material containing an adhesive moulded in said circle and acting when set to provide a central hub adhesively united to the adjacent edges of said layers, and protective disks of heavy cloth secured to said hub and the outer layer of buffing material and the portions of the stitching therebetween by a strong impregnating adhesive.

7. A buffing wheel comprising a plurality of layers of buffing material having a central opening and gathered toward said central opening to form an inner circle of predetermined diameter, a line of through and through stitching securing said layers together, a hub of suitable material fitting within said circle adhesively secured to the contiguous inner edges of said layers, anchoring disks of relatively smaller diameter than said layers adhesively secured throughout their areas to said hub and to the outer layers of buffing material and protective disks overlying said anchoring disks and adhesively secured thereto throughout their contacting areas.

8. The method of making buffing wheels which comprises producing two sets of continuous bands of equal width having superimposed layers of flexible buffing material, securing one of the edges of the layers of each set together and to the other set by a uniting line of stitching having widely spaced stitches, drawing in the line of stitching intermediate of said sets to a circle of predetermined relatively smaller diameter than that of the unstitched edges, thereby gathering the material substantially uniformly along the periphery of said smaller circle and bringing the layers of buffing material into radial relation to the axis of said circle and fixedly securing both sets and the layers thereof together by non-metallic securing means.

9. The method of making buffing wheels which comprises separately and concentrically winding each of two long strips of flexible buffing material of equal width and of substantially equal length to produce two sets of endless bands of superimposed layers, uniting the edges of each set together and to the other set by a line of overedge stitching having widely spaced stitches, drawing in the line of stitching intermediate of said sets to a circle of predetermined relatively smaller diameter than that of the unstitched edges, thereby gathering the material along the periphery of said smaller circle and bringing the buffing material into radial relation to the axis of said circle, and securing all the layers of both sets of bands together by lines of through and through stitching.

10. The method of making buffing wheels which comprises producing two sets of continuous bands having superimposed layers of buffing cloth of equal widths, securing one of the edges of the superimposed layers together and to the other set by a line of overedge stitching having widely spaced stitches, placing the sets of bands thus united upon a cylindrical hub of relatively smaller circumference than the circumference of the united edges of said sets, encircling the line of stitching between the sets of bands by a strong flexible drawing member, drawing said member tightly upon said hub to gather the stitched edges uniformly upon said hub and to cause the layers of superimposed material to extend radially from said hub, securing all the radially assembled layers together by through and through stitching and removing the drawing member.

11. The method of making buffing wheels which comprises producing two sets of continuous bands having superimposed layers of buffing cloth of equal widths, securing one of the edges of the superimposed layers together and to the other set by a line of overedge stitching having widely spaced stitches, placing the sets of bands thus united upon a cylindrical hub of relatively smaller circumference than the circumference of the united edges of said sets, encircling the line of stitching between the sets of bands by a strong flexible drawing member, drawing said member tightly upon said hub to gather the stitched edges uniformly upon said hub and to cause the layers of superimposed material to extend radially from said hub, placing upon opposite faces of said hub anchoring disks of larger diameter than said hub and of smaller diameter than the buffing wheel, and securing said disks to said hub and to the layers of both sets of buffing material by lines of through and through stitching, and securing protecting disks to said anchoring disks by an adhesive impregnating the adjacent surfaces of the anchoring and protecting disks and the portions of the line of stitching therebetween.

12. The method of making buffing wheels which comprises producing two sets of continuous bands of equal width having superimposed layers of buffing material, securing one of the edges of the layers of each set together and to the other set by a uniting line of stitching having widely spaced stitches, drawing in the line of stitching intermediate of said sets to a circle of predetermined relatively smaller diameter than that of the unstitched edges, thereby gathering the material substantially uniformly along the periphery of said smaller circle and bringing the layers of buffing material into radial relation to the axis of said circle, moulding into said circle a mass of plastic material containing an adhesive to produce a hub having a thickness equal to that of the layers of buffing material, uniting the layers of buffing material by through and through stitching, and securing protective disks, of suitably smaller diameter than the diameter of the buffing layers, to the outer layers of buffing material and to the hub by an adhesive impregnating the adjacent surfaces of the protective disks and outer layers and the portions of the stitches therebetween.

13. The method of making buffing wheels which comprises superimposing a plurality of layers of buffing material having like edges gathered to produce a central circle of predetermined diameter, securing said layers together by through and through stitching, moulding within said circle a mass of plastic composition containing an adhesive operable when the plastic material is set to provide a rigid hub and to unite the inner edges of the layers firmly thereto, securing protective disks of suitable diameter, less than the diameter of the buffing disks, to said hub and the outermost layers of buffing material by an adhesive impregnating the adjacent surfaces of the protective disks, said outer layers and the portions of the stitches therebetween.

14. The method of making buffing wheels which comprises superimposing a plurality of layers of buffing material having like edges gathered to produce a central circle of predetermined diameter, securing one of the edges of the layers of each set together and to the other set by a uniting line of stitching having widely spaced stitches, drawing in the line of stitching intermediate of said sets to a circle of predetermined relatively smaller diameter than that of the unstitched edges, thereby gathering the material substantially uniformly along the periphery of said smaller circle and bringing the layers of buffing material into radial relation to the axis of the circle, securing the superimposed layers to an anchoring disk by a line or lines of through and through stitching, cutting the superimposd layers and the anchoring disk upon a circular line intermediate of the overedge stitching and the line of anchoring stitching, securing a protective disk by a suitable adhesive to the anchoring disk, applying a suitable adhesive to the inner edges of the superimposed layers and to the anchoring disk, fitting a hub of suitable material in the hub opening thus formed and adhesively securing a complementary anchoring disk and a complementary protective disk to the opposite face of the superimposed layers.

15. The method of making buffing wheels which comprises superimposing a plurality of layers of buffing material having like edges gathered to produce a central circle of predetermined diameter, securing one of the edges of the layers of each set together and to the other set by a uniting line of stitching having widely spaced stitches, drawing in the line of stitching intermediate of said sets to a circle of predetermined relatively smaller diameter than that of the unstitched edges, thereby gathering the material substantially uniformly along the periphery of said smaller circle and bringing the layers of buffing material into radial relation to the axis of the circle, securing the superimposed layers to an anchoring disk by a line or lines of through and through stitching, cutting the superimposed layers and the anchoring disk upon a circular line intermediate of the overedge stitching and the line of anchoring stitching, securing a protective disk by a suitable adhesive to the anchoring disk, applying a suitable adhesive to the inner edges of the superimposed layers and to the anchoring disk, fitting an integral hub of suitable material in the hub opening thus formed and adhesively securing a complementary anchoring disk and a complementary protective disk to the opposite face of the superimposed layers, and finally cutting an arbor opening centrally through the hub and the anchoring and protective disks.

ELISHA WINTHROP HALL.